Sept. 21, 1937.   R. M. HEINTZ   2,093,442
COMBINATION CRANKSHAFT AND CONNECTING ROD
Filed July 11, 1936
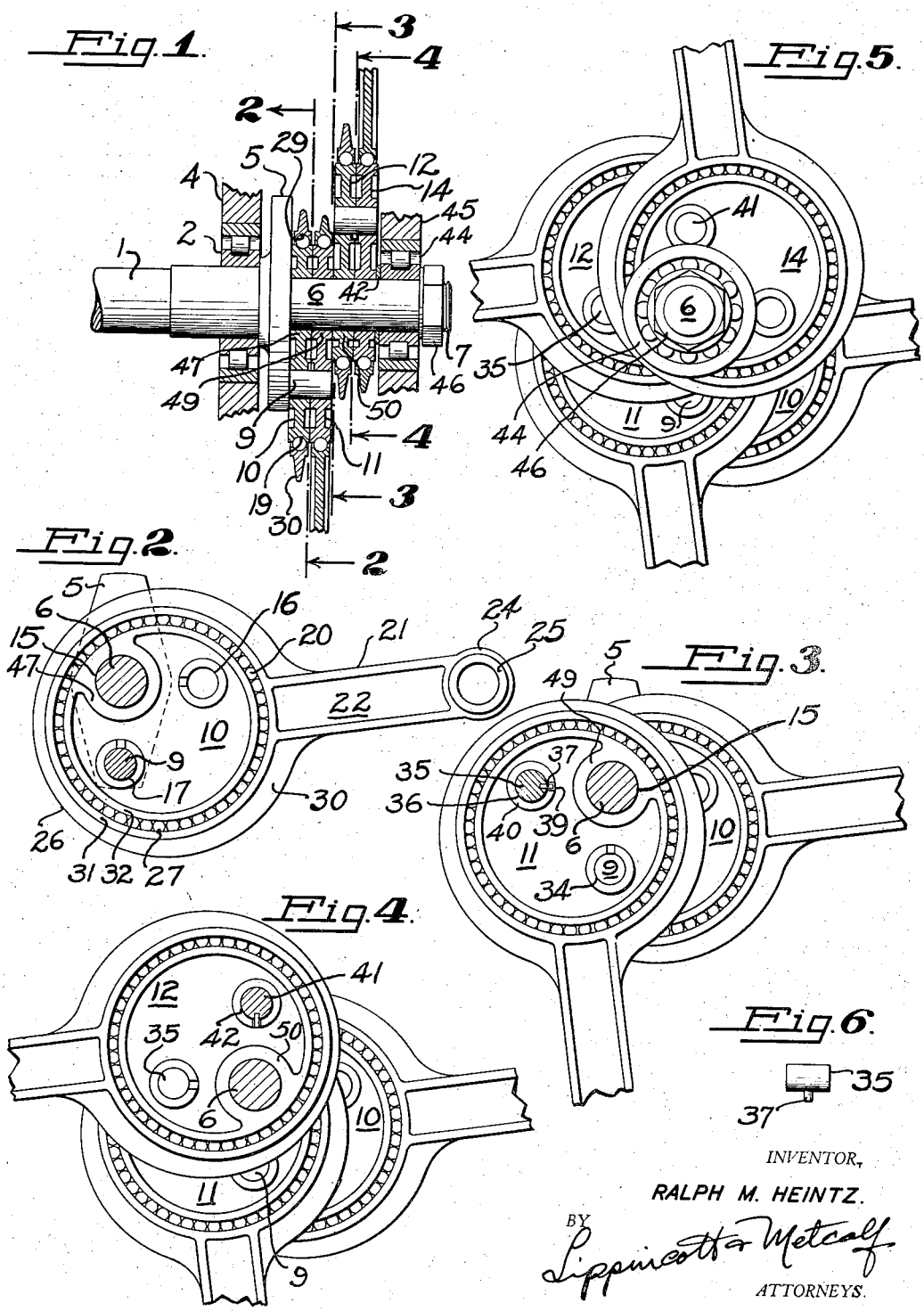
INVENTOR,
RALPH M. HEINTZ.
BY Lippincott & Metcalf
ATTORNEYS.

Patented Sept. 21, 1937

2,093,442

UNITED STATES PATENT OFFICE 2,093,442

COMBINATION CRANKSHAFT AND CONNECTING ROD

Ralph M. Heintz, Palo Alto, Calif., assignor to Heintz & Kaufman, Ltd., San Francisco, Calif., a corporation of Nevada Application July 11, 1936, Serial No. 90,166

10 Claims. (Cl. 74—571)

My invention relates to means for transforming reciprocal to rotary motion, and particularly to the combination of a multiple-throw crank shaft with unitary connecting rods.

The invention herein described has been developed particularly for use in a radial four cylinder internal combustion engine, driving a generator providing electrical power for the operation of lights, wing flap and landing gear motors, radio equipment, and a variety of other purposes on aircraft, particularly in connection with military duty.

There is no intention, however, to limit its application to such use, as it is equally well suited to engines having any number of cylinders, and operable by other means such as compressed air. The use to which the power output is put is not material to the invention, and my mechanism might be equally well applied to compressors, or to any mechanism in which it is desirable to translate reciprocating to rotating movement, or vice versa.

Certain requirements, however, of the service for which my invention was designed have predicated the development of certain features of advantage in this and many other uses to which it might be put.

When a crank shaft is used lacking in rigidity or having considerable length in proportion to its thickness, torsional deflection occurs under load, which interferes with the smooth functioning of the engine. Particularly when used as a prime mover for electrical current generation, the "whip" of the shaft under the stress of successive impulses from the cylinders is detrimental to the wave form of the generator output, and causes irregular voltage and current production. The disadvantages incurred by using such an output, particularly for radio purposes, are obvious.

In addition to the electrical irregularities produced, such deflection causes mechanical vibration which may become severe at the high rotational speeds commonly used in this class of work.

I have found that I may eliminate the excessive shaft deflection and attendant vibration by increasing the diameter of the crank pins until they become eccentrics about the crank shaft, reducing the crank cheeks to zero and utilizing the crank pins themselves to carry part of the torsional stress about the axis of rotation of the crank shaft. This permits reduction of the cylinder pitch almost to the thickness of the connecting rods themselves, assisting materially in reduction in the overall dimensions and weight of the engine. The shorter connecting rod column section permitted by the increased crank pin size allows a further reduction in engine weight.

The efficiency of the engine has been increased by utilizing full row ball bearings about each of the crank pins to transmit force to the connecting rods, and by using needle bearings in the piston end of the connecting rods.

With more conventional types of engines, the replacing and servicing of connecting rods, crank shafts, and pistons is a job requiring trained personnel and special tools. My invention provides a unitary connecting rod and crank shaft structure which can be replaced in an engine by even relatively unskilled workers in a very short time without the use of special tools. I have so simplified the design, and provided symmetrically formed parts, that the parts are interchangeable, and can be assembled without loss of time in fitting and adjusting.

Among the objects of my invention are: To provide a simple and economically constructed connecting rod for use with an internal combustion or other type of engine or any apparatus for relating reciprocating and rotary motion; to provide a combined eccentric crank and connecting rod which may be constructed of easily procurable materials; to provide a connecting rod and eccentric crank in unitary form; to provide such a unit in a symmetrical form; to provide a unitary connecting rod and eccentric crank which may be more easily replaced within an engine; to provide a combined connecting rod and eccentric crank in which friction loss shall be reduced to a minimum; to provide a combination of connecting rod and crank in which the moving parts shall be separated by anti-friction bearings; to provide a connecting rod having a very short column section; to provide a connecting rod adapted for use with a short stroke engine; to provide a connecting rod adapted for use in extremely compact radial engines; to provide a connecting rod and crank shaft combination in which the crank cheeks are eliminated; to provide an engine design wherein the cylinder pitch need be only a very slight amount greater than the thickness of the connecting rods; and to provide a combination of anti-friction crank bearing and connecting rod.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

My invention comprises, broadly as to apparatus, an anti-friction connecting rod and crank shaft assembly, wherein the cranks are eccentrically mounted cylinders fixed upon a central shaft in constant angular and spatial relation to each other and to said shaft, and wherein each crank, together with its associated bearing and connecting rod, constitutes a symmetrical unit interchangeable with the others of said crank and rod combinations.

Referring to the drawing:

Figure 1 shows a view, partially in section, of my crank and bearing units assembled on a shaft.

Figure 2 shows an elevational view of the assembly of Figure 1, partially in section, taken along line 2—2 of Figure 1.

Figure 3 shows an elevational view, partially in section, of the assembly of Figure 1, taken along line 3—3 of Figure 1.

Figure 4 is an elevational view, partially in section, taken along line 4—4 of Figure 1.

Figure 5 is an elevational view of the completed assembly shown in Figure 1.

Figure 6 is a detailed view of a driving pin, showing the locking stud which prevents displacement of the driving pin along its longitudinal axis after being fitted into two adjacent cranks.

The detailed description of my invention may be better understood by reference to the drawing.

In Figure 1 of the drawing, the main shaft 1, to which is attached the generator rotor, not shown, is supported rotatably about its own axis by an anti-friction bearing 2, which in turn is supported by a housing element 4. Shaft 1 normally rotates in a vertical plane, but is represented horizontally in the figures for convenience. The housing of which element 4 is a part also supports the generator and the cylinders, none of which are shown in the drawing, and provides mounting means for the entire assembly. A driving flange 5 is formed upon, and normal to, shaft 1. Beyond flange 5, shaft 1 is reduced to a cylindrical section 6, terminated by threaded portion 7. A driving pin 9 extends from said driving flange 5 parallel to the shaft section 6. Pin 9 extends from flange 5 a distance equal to the thickness of two crank members 10 and 11.

A plurality of cylindrical cranks 10, 11, 12, 14, corresponding in number to the number of cylinders in the engine, is disposed on and about the shaft section 6. These cranks are of exactly similar structure, and a detailed description of one will indicate the construction of all.

Figure 2 shows an elevational view of crank 10. A shaft receiving bore 15 is eccentrically disposed through said crank, said bore having a diameter sufficient to permit a tight sliding fit over shaft 6.

Two drive pin bores 16 and 17 are disposed through the crank 10 symmetrically about the axis defined by the geometrical center of said crank and the center of the shaft receiving bore 15, at a center-to-center distance from said bore equal to the center-to-center separation of drive pin 9 and shaft 6, and having a diameter sufficient to permit a very tight sliding fit over said drive pin 9.

I desire to utilize crank 10 as one element of a ball bearing assembly through which power may be transmitted between shaft 1 and a connecting rod, to be described below. For this purpose a groove is formed peripherally about the crank 10, adapted to act as a ball race 19, upon which balls 20 may travel.

The thickness of crank 10 may be reduced in the portions thereof in which the stresses are least intense, and the mass may be further reduced by providing further symmetrically located bores, not shown in the drawing, through the lightly stressed portions of said crank, leaving a boss or shoulder surrounding the main shaft bore and drive pin bores, and around the circumference of the crank.

Connecting rod 21 has a short I-section column 22, with a small eye 24 formed upon one end having a needle bearing 25, shown schematically, disposed therethrough, of suitable size to pivotally engage a piston pin within a piston, neither being shown in the drawing. Upon the end of column 22 opposite to eye 24 is formed a large eye 26, having a circular bore 27 therethrough. A groove is disposed about the interior periphery of eye 26, adapted to act as a ball race 29. The diameter of eye 26 and the depth of race 29 are so proportioned that there will exist a difference in diameter between the race 29 and race 19 equal to twice the diameter of balls 20. A shoulder 30 so shaped as to distribute stress between column 22 and eye 26 over a considerable portion of the circumference of the latter is formed integral with said eye 26 and column 22.

In order to form a unitary structure of crank and rod, races 19 and 29 are grooved deeply into their respective supporting structures, and the resultant high bearing shoulders 31 and 32 on eye 26 and crank 10 respectively, effectually prevent accidental lateral misalignment of said crank and crank eye.

Loading slots of conventional type, not shown in the drawing, are provided through which balls 20 may be inserted in assembling the crank and rod structure. A "snap" or interference of .015" to .020" has been found satisfactory.

Since there is very little stress parallel to the axis of rotation of shaft 6 between the crank and connecting rod, these loading slots may be used without interfering with the bearing efficiency even at high speeds.

The assembly of the balls into the races through the loading slots is made possible by chilling the crank to a low temperature with liquid air, heating the large eye to about 300° F. Modern practice indicates the use of full row ball bearings, without separators, or spacing rings, for this type of service. Although the disadvantages of full row loading at high speeds are well known it has been found that careful design allows heavy loading without reducing the long life expectancy of the bearing. Under the conditions in which it is to be utilized, this type of bearing is satisfactory because its relative size is large, there are a comparatively large number of balls, the arched section of the outer race is small, the inertia forces cancel some of the stresses on the balls, and the continuously changing and reversing stresses prevent jamming and friction between the balls.

The sequence of assembling the complete crank shaft is indicated in Figures 2–5. The bore 15 of crank 10 is slid onto shaft 6, and drive pin bore 17 is aligned with and forced onto driving pin 9, as indicated in Figure 2. Another crank, 11, shown in Figure 3, is forced onto shaft 6, rotated 90° thereabout from the position occupied by crank 10, and driving pin bore 34 disposed therethrough is aligned with and forced onto drive pin 9.

A drive pin 35 is inserted into the remaining drive pin bore 36 of crank 11. A locking stud 37, driven into pin 35 midway of its ends, is aligned with a groove 39 cut into the surface of the boss or shoulder 40 surrounding bore 36 on a line between the center of said bore and the center of the main shaft bore 15. The length of pin 35 is made equal to the thickness of two cranks. Figure 6 shows a detailed view of this locking pin and stud.

Another crank 12, shown in Figure 4, is put on in similar fashion over shaft 6 and drive pin 35, rotated 90° about shaft 6 from the position occupied by crank 11 and 180° from that of crank 10. The locking stud 37 is held between the adjacent cranks 11 and 12, and drive pin 35 is thereby prevented from working out of position. A driving pin 41 is inserted into drive pin bore 42 with its locking stud properly aligned.

Crank 14 is next fitted over shaft 6 and drive pin 41, with an angular displacement of 90° from crank 12. In the event that it is desired to use my invention with a greater or lesser number of cylinders, the crank design may be changed to permit a different angular displacement between adjacent cranks. The angle formed by lines drawn between the centers of the drive pin bores and the center of the crank shaft bore must be such that when multiplied by the number of cranks, the product will be 360° or a multiple thereof. (This angle must, however, be less than 180° or there will be no eccentricity.) Unless this condition is complied with the arrangement will not be symmetrical about the central shaft. Figure 5 shows the complete assembly, with further elements added.

A washer 42 is then slipped over shaft 6, and a bearing 44 fitted over said shaft and within a housing member 45. Bearings 2 and 44 are of a type capable of withstanding both radial and transverse loads, and are therefore suited to maintain the alignment of the cranks and rods when shaft 6 is rotating in a vertical plane, and to carry part of the weight of the generator rotor, not shown, fixed about shaft 1.

A nut 46 is threadably engaged with the threaded portion 7 of shaft 6, and is tightened until a compressive stress of about 15,000 pounds is set up in said shaft.

The friction thus set up between the driving flange 5 and the shoulder 47 disposed on crank 10 about shaft 6, between shoulder 47 on crank 10 and a similar shoulder 49 on crank 11, between shoulder 49 and a shoulder 50 on crank 12, and between shoulder 50 and a corresponding shoulder on crank 14, is so great as to effectively increase the cross-sectional area of shaft 6. A considerable amount of torque may be transmitted to shaft 1 through the frictional connection to the driving flange 5, and, the "whip" or torsional deflection possible with a shaft so short in relation to its effective diameter is negligible.

Since part of the torsional stress is transmitted through the frictional connection between adjacent cranks to the driving flange, the stress on the driving pins is smaller than would otherwise obtain. Hence greater tolerances between drive pins and drive pin bosses may be permitted, and assembly without special equipment is possible.

In summary, my invention provides a unitary structure for the conversion of reciprocating to rotating motion, or vice versa.

Each connecting rod forms an inseparable unit with its associated anti-friction bearing and eccentrically bored crank. The units as formed are interchangeable and reversible, and can be assembled into an engine without special tools in a very short time without the exercise of exceptional skill. When so assembled, the effective cross-sectional area of the crank shaft is considerably increased and the high ratio of diameter to length is sufficient to practically eliminate "whip" in the shaft. These effects are produced by eliminating the crank cheeks and holding the eccentric cranks against each other under high compressive stress, whereby the cranks themselves may transmit, through said frictional connection, a part of the torque about the axis of rotation to a driving flange.

This design permits use of a cylinder pitch only slightly greater than the thickness of the connecting rods, and a consequent reduction in the overall size and weight of the engine. It is not limited to the number of cylinders described, nor to the exact embodiment shown, and details of design may vary according to the particular service for which it is intended. These variations are merely matters of mechanical skill, and may be made by persons skilled in the art within the scope of the appended claims, and without departing from the spirit of my invention.

I claim:

1. A multiple-throw crank shaft assembly, comprising a main shaft, a plurality of like circular cranks, each having an eccentric bore for receiving said main shaft and having two drive pin bores symmetrically positioned about the plane defined by the geometrical center of said crank and the axis of said main shaft bore, a plurality of drive pins, each adapted to fit within said drive pin bores in two adjacent cranks whereby each crank may drive adjacent cranks through the medium of said pins, and means fixed to said main shaft and one of said pins for transmitting power therebetween.

2. A multiple-throw crank shaft assembly, comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing through said drive pin bores in two adjacent cranks, whereby each crank can drive the adjacent cranks through the medium of said pins, means to maintain a fixed relation between said pins and said cranks, and means fixed to said main shaft and to one of said pins for transmitting power therebetween.

3. A multiple-throw crank shaft assembly, comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to the adjacent cranks and drive said adjacent crank through the medium of said pins, means to maintain said pins in fixed position relative to said cranks, and means fixed to said main shaft and to one of said pins for transmitting power therebetween.

4. A multiple-throw crank shaft assembly comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, and means fixed to said main shaft and to one of said pins for transmitting power therebetween.

5. A multiple-throw crank shaft assembly, comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, and a driving flange formed upon said main shaft having one of said driving pins fixedly attached thereto, whereby torque may be transmitted between said cranks and said main shaft.

6. A multiple-throw crank shaft assembly comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, and a driving flange formed upon said main shaft having one of said driving pins fixedly attached thereto, whereby torque may be transmitted between said cranks and said main shaft, and means for compressing said cranks against said driving flange.

7. A multiple-throw crank shaft assembly, comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, and a driving flange formed upon said main shaft having one of said driving pins fixedly attached thereto, whereby torque may be transmitted between said cranks and said main shaft, and means for compressing said cranks against said driving flange, whereby torque about said main shaft may be transmitted from said cranks to said driving flange through the medium of the frictional connection therebetween.

8. The combination of unitary connecting rod structures with a multiple-throw crank shaft assembly comprising a main shaft, a plurality of like circular cranks, each having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, a driving flange formed upon said main shaft having one of said driving pins fixedly attached thereto, whereby torque may be transmitted between said cranks and said main shaft, means for compressing said cranks against said driving flange, and means whereby the periphery of each of said cranks constitutes the inner race of a full-row ball bearing assembly whereof the outer race is formed integrally with one end of a connecting rod.

9. In combination, a multiple-throw crank shaft and connecting rod assembly, comprising a main shaft, a plurality of like circular cranks, a connecting rod associated with each of said cranks, each of said cranks having an eccentric bore for receiving said main shaft and having two drive pin bores symmetrically positioned about the plane defined by the geometrical axis of said crank and the axis of said main shaft bore, a plurality of drive pins, each passing slidably through said drive pin bores in two adjacent cranks, whereby each crank can maintain a fixed angular relation to adjacent cranks, and whereby torque may be transmitted through the medium of said pins between said adjacent cranks about said main shaft, means to maintain said pins in fixed position relative to said cranks, a driving flange formed upon said main shaft having one of said driving pins fixedly attached thereto, whereby torque may be transmitted between said cranks and said main shaft, means for compressing said cranks against said driving flange, and means whereby the peripheries of such eccentric cranks form the inner races of ball bearing assemblies, the outer races of said bearing assemblies being formed upon the interior periphery of bores within enlarged ends of the associated connecting rods.

10. In a mechanism utilizing reciprocating pistons and a revolving crank shaft, means for transmitting power therebetween, comprising a plurality of connecting rods, a flange fixed upon said shaft, a plurality of circular cranks eccentrically mounted upon said shaft, means for compressing said cranks against said flange, means for maintaining a fixed angular relation between said cranks and said flange whereby torque may be transmitted therebetween, and anti-friction bearings formed peripherally about each of said cranks, each of said bearings being formed within one end of a connecting rod pivotally connected at the end opposite said bearing to one of said reciprocating pistons.

RALPH M. HEINTZ.